Oct. 9, 1962  R. L. BRONNES  3,057,445
METAL-TO-CERAMIC SEAL AND METHOD OF MAKING SAME
Filed May 23, 1958
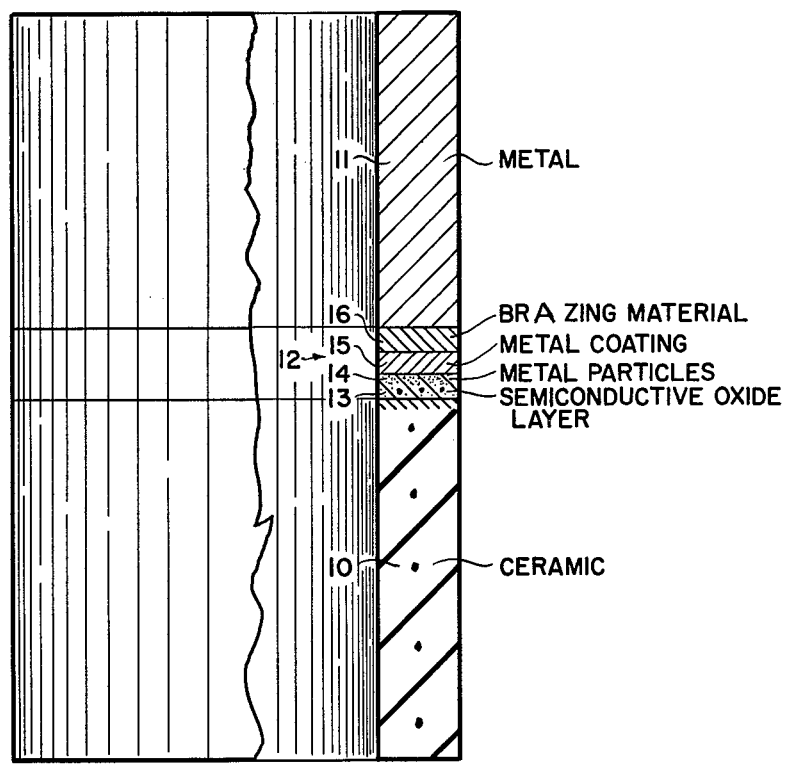
INVENTOR.
R.L. BRONNES
BY
AGENT United States Patent Office 3,057,445
Patented Oct. 9, 1962

3,057,445
METAL-TO-CERAMIC SEAL AND METHOD OF MAKING SAME
Robert L. Bronnes, Irvington, N.Y., assignor to North American Philips Company, Inc., New York, N.Y., a corporation of Delaware
Filed May 23, 1958, Ser. No. 737,438
15 Claims. (Cl. 189—36.5)

This invention relates to metal-to-ceramic seals and methods of making same, and particularly to such seals which are vacuum-tight and thus may be employed in the construction of evacuated or gas-filled envelopes for electrical devices, such as electron devices and the like.

There are several methods known for constructing vacuum-tight metal-to-ceramic seals for electron devices. One popular technique is known as the molybdenum-manganese process, which comprises applying to the surface of the ceramic member a finely divided mixture of molybdenum and manganese powder, which is then fired in a reducing hydrogen atmosphere at about 1400° C. to sinter the metal powder to the ceramic surface. To the thus-produced metal surface may be applied a metal layer by conventional techniques. Another popular technique, referred to as the active metal process, comprises applying titanium or zirconium hydride powder to the surface of the ceramic part, placing over the powder a suitable brazing material and the metal half of the seal, and then firing in vacuum at about 900° C. to dissociate the hydride and effect a seal between the ceramic and metal parts.

These methods as well as other known methods suffer from deficiencies which render them impractical for use in mass-production, or which make them unduly expensive to the manufacturer confronted with the problem of producing a vacuum-tight seal. The main deficiencies are the high firing temperatures required or the expensive furnace equipment needed to carry out the method. It will be appreciated that the cost of a furnace whose upper limit is, say, 1150° C. is in some cases less than one-half the cost of an identical furnace whose upper temperature limit is 1400° C. Further, furnaces which enable the firing to take place in vacuum are three or more times more expensive than those which enable the firing to take place in air or some gas atmosphere at atmospheric pressure. The conventional techniques described above either require high firing temperatures or vacuum furnaces in order to make proper seals, and so require an investment in capital equipment that is excessive.

There are other characteristics of these seals which must be considered in determining whether or not a satisfactory process for their preparation exists. The bonding material which joins together the ceramic and metal portions of the seal should possess controlled flow properties. This means that, when portions of the bonding material liquify, it nevertheless maintains its proper position on the ceramic part when the latter occupies a suitable position in the furnace. This requirement is important because the form and shape of the seals may be fairly complicated, and good flow control means that excessive care need not be taken in the positioning of the parts or in the design of the seals to avoid undue flow of the bonding material to undesired areas of the ceramic member.

Another important property required of such seals is their ability to withstand high operating temperatures of the order of 600° C. or so. This is significant because the most important application at the present time for these seals is in the manufacture of ceramic-enveloped vacuum tubes, which are designed to operate at temperatures ranging in some cases as high as 600° C. Thus, the seal should remain intact and vacuum-tight at these high operating temperatures, which means, in addition to other things, that there be in the bonding material no readily vaporizable materials.

One object of the invention is to provide an improved vacuum-tight, ceramic-to-metal seal which is capable of withstanding high operational temperatures.

Another object of the invention is to provide a new method of making vacuum-tight, metal-ceramic seals that can be carried out at temperatures below 1150° C. and which does not require the use of expensive vacuum furnaces.

Still a further object of the invention is to provide a novel sealing method for joining together metal and ceramic members by use of a bonding material which possesses excellent flow control and yet is tenaciously bonded to the metal and ceramic members to form a strong vacuum-tight bond.

Briefly stated, the improved seal of the invention is characterized by a structure comprising, in the sealed region, a metal-dispersed, semiconductive material bonded to a ceramic member and a metal coating tightly bonded to a surface of the semiconductive layer, to which coating may then be secured a metal member. The improved seal is obtained by applying to the surface of the ceramic member a mixture of two oxides selected to exhibit certain properties which may be essentially described as difficultly-reducible and easily-reducible. The proportions of the two oxide components are chosen so that the mixture will wet the ceramic at a temperature of about 1150° C. or less. The mixture is first fired in an oxidizing atmosphere at a temperature no higher than 1150° C. to cause the oxidic mixture to wet the ceramic and, upon cooling, effect a strong bond therewith. Thereafter, the assembly is fired a second time at a temperature no higher than 1150° C. in a reducing atmosphere causing partial, only, reduction of the difficultly-reducible component and the formation of a semiconducting matrix throughout which is dispersed metal particles of the completely-reduced, easily-reducible component. These metal particles are maintained in good electrically-conductive relation by virtue of the semiconducting matrix. Thereafter, this metal-impregnated semiconducting surface is metallized by applying thereto by conventional techniques a pure metal coating. To this last-named metal coating may be secured a metal member by brazing or soldering in the usual way.

The invention will now be described in greater detail with reference to the accompanying drawing, of which the sole FIGURE is an elevational and partly cross-sectional view of metal and ceramic members bonded together in accordance with the invention to form a vacuum-tight seal, which may be used in the manufacture of electron tubes.

Referring to the drawing, one member of the seal is a ceramic member 10, shown as a cylinder in the figure. By "ceramic" member is meant a refractory member composed of oxides and possessing a predominantly crystalline structure and a melting point of 1400° C. or higher. The usual metal oxides constituting such ceramic members are aluminum oxide, silicon oxide, magnesium oxide, sodium oxide, calcium oxide, and others. The most popular material for use in these seals is an alumina body consisting mainly of aluminum oxide. A metal cylinder 11, in this case, constitutes the other half of this seal. The metal of the cylinder 11 may be any of the conventional metals used in the manufacture of electron devices, for example, tungsten, molybdenum, steel, nickel, copper and the like. Joining the metal and ceramic members together is a bond referred to generally by the reference numeral 12. It comprises, as shown, a semiconducting oxidic material 13 bonded to and alloyed with the underlying ceramic member 10. The oxide layer in the bond has dispersed within it metallic particles 14 which are electrically connected together by the semiconducting matrix 13, whose conductivity is not as highly conductive as a metal, but not as insulating as an oxide or ceramic material. To the surface of the semiconducting matrix is bonded a metal coating 15. This may be done by electroplating or volatilization, or any like process for applying metal particles directly onto an exposed metallic surface. This metal coating 15 constitutes a base to which the metal member of the seal 11 may be secured by conventional techniques. For example, a layer of brazing material 16 may be applied to the plated surface, the metal cylinder 11 placed above it, and the assembly heated to a temperature at which the brazing material melts and bonds the metal cylinder 11 to the metal surface 15. Typical brazing materials that can be used are copper or silver metallic compositions, though any brazing material that will wet both the metal of the cylinder 11 and that of the coating 15 is, of course, usable. If desired, the metal member may be joined to the metal surface 15 by means of a soldering material. The choice of soldering compositions will naturally depend on the composition of the cylinder 11 and the coating 15.

The manner of forming the seal of the invention will now be described in greater detail. The seal is prepared by applying to the surface of the ceramic member a finely divided mixture of oxides. The form of the application is conventional, and the oxide mixture may be applied by any of the conventional applying techniques, such as brushing, spraying, silk screening and the like. In general, the powder mixture will be mixed with a liquid binder to form a pasty material for ease of application. A suitable binder is the well-known amyl-acetate-nitrocellulose binder in which the mixture of metal oxide particles is suspended. The binder material is not critical and most liquids even including water may be used satisfactorily. The viscosity is adjusted for the applying technique used by simply changing the ratio of liquid to metal oxide powder in the desired manner.

The oxide mixture employed includes a difficultly-reducible oxide and an easily-reducible oxide. The difficultly-reducible oxide is chosen from those of the transition heavy metals having standard free energies of formation in excess of 80 kilocalories/gram-atom of oxygen (for the lowest state of oxidation). This class of metal oxides includes vanadium oxide, titanium oxide, zirconium oxide, hafnium oxide, columbium oxide, tantalum oxide, chromium oxide and manganese oxide. Either one or more of these oxides may be included as the difficultly-reducible oxide. The easily-reducible oxides are selected from that class of metal oxides which can be readily reduced to the metal form by heating at temperatures below 1150° C. in commercially-available reducing atmospheres and which are not excessively volatile or possess unduly low melting points. This class of oxides would include, among others, copper oxide, nickel oxide, cobalt oxide, silver oxide, iron oxide, and oxides of the noble metals, though the latter are not too convenient as well as being expensive. The choice of proportions or the ratio of difficultly-reducible to easily-reducible oxide will be explained later. The selected oxide mixture is finely ground and admixed with the desired liquid, and the resultant suspension applied to the surface of the ceramic member to be sealed. The coated ceramic is first fired in an oxidizing atmosphere and at a temperature, below 150° C., at which the portion of the oxide coating contacting the ceramic member liquifies and wets the ceramic surface so as to enable a strong bond to be produced. Air is the preferred oxidizing atmosphere. The firing time is not critical, and need be continued only until wetting obtains to enable a bond to be produced. Firing times ranging from 15 to 60 minutes have been employed satisfactorily. No upper limit of firing time has been found. It will be obvious that materials that convert to the corresponding oxides during this first firing step can also be used in place of the oxides per se. For example, one may use carbonates, such as copper carbonate, which would convert to copper oxide during the firing step in the oxidizing atmosphere. From the other extreme, finely-divided vanadium metal is converted to the oxide form when heated in an oxidizing atmosphere, and so it may be used in place of the oxide. Though these represent acceptable variations, for best results, as well as for convenience and simplicity, it is preferred to use the oxides directly.

Next, a second firing step in a reducing atmosphere must be carried out. This may be done by simply flowing a reducing gas at atmospheric pressure through the same furnace used for the first firing step and without cooling it to room temperature. Alternatively, the furnace may be cooled down to room temperature, the air atmosphere replaced by a reducing atmosphere, and the furnace reheated to the desired temperature. The firing temperatures generally range between 800 and 1150° C. and the required reducing atmosphere must function in that capacity in this temperature range. Dried tank hydrogen has been used successfully for this purpose. Also, mixtures of hydrogen and nitrogen, with the hydrogen predominating, may also be used. The reducing atmosphere should be dry as any moisture therein may counteract the reduction and prevent its being carried to completion.

It has also been found that an air-reacted hydrocarbon gas can also be used as a reducing atmosphere in the inventive technique, with the CO component of the reacted hydrocarbon gas acting as the reducing agent. No carburization of the bonding materials is encountered because of their compositional nature. This offers the great advantage of a tremendous reduction in the cost of supplying a suitable reducing atmosphere. For example, ordinary city or natural gas can be passed through a so-called gas-atmosphere generator wherein it is reacted with air and the reaction products, consisting of inert gases with CO, employed as described to provide the reducing atmosphere.

The purpose of this second firing step is to form a semiconducting surface on the oxide coating by completely reducing the easily-reducible oxide but only partially reducing the difficultly-reducible oxide, to establish a semiconducting matrix which electrically connects together the metal particles of the easily-reduced oxide which are dispersed throughout the matrix. In several seals made in accordance with the invention, the conductivity of the matrix was of the order of fractions of an ohm-cm. The absolute value is not critical. All that is required is that sufficient conductivity be present so that the dispersed metallic particles are maintained in satisfactory electrical engagement and present a surface on which a pure metal coating may be applied with ease. The compositions indicated for the difficultly-reducible oxide component ensure this result. Further, since only partial reduction of this difficultly-reducible oxide will occur in the reducing atmosphere at temperatures below 1150° C., a portion of the oxide mixture will always remain in the oxide state. This ensures a strong, tight bond to the ceramic member which is believed more adherent than prior art seals and which therefore permits less stringent processing to maintain. Still further, the presence of this oxide component, which always remains in the oxide state, enables dimensional stability of the seal region to be maintained within close tolerances.

The reducing step affects mainly the easily-reducible oxide component of the mixture, and preferably fully reduces it to the metal form at least at the surface of the mixture. If the heating were prolonged, then the reduction of the easily-reducible oxide would obtain throughout the oxide mixture. For the usual seal region, which it will be appreciated has been greatly exaggerated in the drawing in order to improve the showing, firing times for the reducing step of between 15 to 90 minutes have been employed satisfactorily. There appears to be no objection to prolonging the firing time beyond the upper limit indicated.

As far as the weight ratio of difficultly-reducible to easily-reducible oxide is concerned, satisfactory seals can be made with ratios ranging from about 1:20 to 2:3. As the amount of the difficultly-reducible oxide is increased, the required firing temperatures increase and at the higher ratios being to exceed the value of 1150° C., which is undesirable. The lower limit of this ratio is a consequence of the need in the seal region for some stable, undissociated oxide for ensuring a firm bond to the ceramic member. Thus, in general, the difficultly-reducible component will be a minor proportion, and the easily-reducible component a major proportion of the oxide mixture.

One of the features of the invention is the discovery that a semiconducting surface produced in the manner above-described makes an excellent foundation upon which to form a pure metal surface by conventional techniques. For example, a metal coating may be electroplated directly onto the semiconducting surface. No critical steps have been found in this plating process and purely conventional techniques have been employed. If desired, a metal coating may be applied by vaporization. This metal plating or coating adheres tightly to the semiconductive surface and forms a true vacuum-tight bond. Finally, the metal half of the seal may be joined by brazing or soldering in the conventional way to the exposed metallized surface at the seal region.

The resultant structure in and near the seal region is as follows. The entire seal region is crystalline in nature. No vitreous or glassy phases are present. At portions remote from the seal is the unaltered ceramic member. The portion of the ceramic member adjacent the seal region has alloyed with the oxide mixture causing penetration by the oxide coating into the ceramic member. This penetration and alloying is responsible for the strong, vacuum-tight bond of the oxide coating and ceramic member. The oxide layer is comprised of a semiconducting matrix resulting from the partial reduction of the difficultly-reducible oxide component—which nevertheless remains in the oxide state—throughout which matrix is dispersed the metal particles from the completely-reduced, easily-reducible oxide component. Because the interior of the oxide layer is less affected by the reducing step, there is naturally a graded conductivity and graded concentration of metal particles in the oxide layer with the higher conductivity and larger concentration of metal particles at the surface. The dispersed metal particles which are electrically connected together by the semiconductive matrix constitute an excellent base for the provision of a pure metal coating by electroplating or volatilizing or the like. Hence, the next layer in the seal is the pure metal plating tightly adherent to the subjacent semiconducting surface. This is followed in turn by the brazing material and the metal half of the seal, if this is the construction desired.

Both the difficultly-reducible and easily-reducible oxides are necessary to produce a satisfactory seal in accordance with the invention with the high-temperature ceramic member described. If the easily-reducible oxide were used alone, it is found impossible to obtain satisfactory alloying and bonding to the refractory, crystalline, ceramic member. On the other hand, if the difficultly-reducible oxide were used alone, it is not possible to provide, by plating or volatilization, a pure metal coating thereon that will tightly adhere thereto, because of the lack of a sufficiently conductive surface.

In order to assist those skilled in the art to carry out the invention, there follow below several specific examples of vacuum-tight seals made in accordance with the invention.

*Example I.*—A mixture of oxides was formed by adding to an amyl acetate-nitrocellulose binder about 30 weight percent of vanadium pentoxide and 70 weight percent cupric oxide; about 10 grams of this finely-divided oxide mixture was added to about 10 cc. of the binder to form a suspension. The resultant suspension was then brushed onto the surface of an alumina cylinder as shown in the drawing. The coated ceramic was then placed in a furnace and fired in air at about 975° C. for 30 minutes. Next, the air atmosphere was replaced by a dried tank hydrogen atmosphere and the firing continued at 1000° C. for 20 minutes. After cooling, the coated ceramic was placed in an electroplating tank and a first thin layer of copper (flash) was electrolytically deposited on the coated region, followed by a thicker nickel plating. On top of this metal coating was placed a fine silver wire ring, as brazing material, and on top of the ring was placed a cold-rolled-steel cylinder. The assembly was fired in a dried tank hydrogen atmosphere to the melting point of the silver brazing material, which, when melted, wetted the metal plating on the ceramic and the steel cylinder, forming a strong bond therebetween. The resultant seal was found to be extremely strong and durable and perfectly vacuum-tight. The reducing atmosphere for the brazing operation may be obtained from a mixture of nitrogen and hydrogen.

*Example II.*—An oxide mixture constituted of 30% by weight of tantalum dioxide and 70 weight percent of cupric oxide was formed and added to the same binder employed in Example I. The same firing conditions and atmospheres were employed as in Example I, and the same electroplating and brazing operations were also used. The resultant seal was strong and vacuum-tight.

*Example III.*—Satisfactory seals between ceramic and metal members have also been made with oxide mixtures of zirconium oxide, cobalt oxide and copper oxide in weight percent ranging from 9, 27 and 63 respectively, to 29, 21 and 50, respectively. These mixtures were fired in air at temperatures of 975° C. and 1150° C. The remaining steps were the same as disclosed in Example I.

*Example IV.*—Seals similar to that disclosed in Example I were made using chromium oxide, copper oxide and cobalt oxide mixtures; manganese oxide, copper oxide and cobalt oxide mixtures; hafnium oxide, copper oxide and cobalt oxide mixtures; columbium oxide, copper oxide, cobalt oxide mixtures; and titanium oxide, copper oxide and cobalt oxide mixtures.

*Example V.*—Also, seals similar to that disclosed in Example I were were made with about 20 weight percent of vanadium oxide, 47 weight percent of copper oxide, and 33 weight percent of nickel oxide. The remaining steps were the same as in Example I.

Best results have been found with mixtures of 20 to 30 weight percent of vanadium pentoxide and the remainder of cupric oxide, and about 30% of titanium oxide and the remainder of cupric oxide, so that these are the preferred mixtures for use in the invention.

The metal-to-ceramic seal of the invention has been found to possess excellent physical and chemical properties. The layers in the seal region strongly adhere and maintain vacuum-tightness even under the most severe conditions. Further, none of the components used in the seal possess low temperature limitations, that is, the resultant seal can withstand temperatures up to the brazing temperature employed for joining the metal half of the seal to the metallized surface of the ceramic. Further, none of the constituents of the seal are readily volatilizable, which might cause deterioration or destruction of the seal when it is maintained at elevated temperatures for long durations. Still further, the seal materials used readily fuse and possess excellent flow properties, and better flow control is obtained than was found with the prior art constructions. What this means is that uniform coverage of the desired areas is obtained as well as smooth coatings of fine particle size. Further, the materials remain confined to the areas where they are initially provided and readily wet the areas they are supposed to. This ensures good dimensional stability and less likelihood of contamination of electrode parts of the device housed in an envelope constructed with a seal of the invention. This less contamination feature also follows from the presence in the seal region of non-volatile components. As a further advantage, less care need be exercised in the manufacture of the seals because the essential element in the seal which makes it so adherent and so strong, namely, the difficultly-reducible oxide, cannot be easily affected by an undue rise in temperature or contamination of furnace atmosphere during the processing. Finally, simpler processing results from the fact that the semiconductive surface is quite stable, smooth and strong, so that wire brushing and the like is not necessary to provide a suitable substratum for the plating operation.

While the inventive seal and its manner of preparation have been described in connection with the sealing together of separate metal and ceramic members, it will be appreciated that the real novelty is in the method employed for metallizing the ceramic surface. After the metal plating or other pure metal layer has been applied to the semiconducting surface to form a strong vacuum-tight bond, the remaining techniques for securing that metal surface to like metal surfaces or metal members are perfectly conventional. As described, brazing or soldering steps may be employed to seal the metallized ceramic member to the metal cylinder shown in the drawing. It will also be obvious that two metallized ceramic members made as described above can be brazed together in the same way as the metal cylinder was brazed to the single metallized ceramic member. Such a construction is useful in the manufacture of ceramic envelopes for vacuum tubes, with the metallized layers between the two ceramic cylinders being employed to establish an electrical connection to an electrode of a conventional electrode system on the interior of the envelope.

Thus, while I have described my invention in connection with specific embodiments and applications, other modifications thereof will be readily apparent to those skilled in this art without departing from the spirit and scope of the invention as defined in the appended claims.

What is claimed is:

1. A method of metallizing a ceramic member comprising, applying to a surface portion of said ceramic member an oxide mixture including a difficultly-reducible oxide having a standard free energy of formation in excess of 80 kilocalories/gram-atom of oxygen and an easily-reducible oxide having a standard free energy of formation not in excess of approximately 58.4 kilocalories/gram-atom of oxygen the proportions by weight of said difficultly-reducible oxide to said easily-reducible oxide being about 1:20 to 2:3, firing the coated ceramic member in an oxidizing atmosphere and at a temperature at which the oxide mixture wets the underlying ceramic member and alloys thereto, thereafter firing the coated ceramic member in a reducing atmosphere at a temperature at which the easily-reducible oxide in a surface portion of the coating is reduced to the metal and at which the surface portion is rendered semiconductive, and thereafter applying a metal coating to said semiconductive surface.

2. A method as set forth in claim 1 wherein the oxidizing atmosphere is air.

3. A method of metallizing a ceramic member comprising, applying to a surface portion of said ceramic member an oxide mixture including a minor proportion of a difficultly-reducible oxide having a standard free energy of formation in excess of 80 kilocalories/gram-atom of oxygen and a major proportion of an easily-reducible oxide having a standard free energy of formation not in excess of approximately 58.4 kilocalories/gram-atom of oxygen the proportions by weight of said difficultly-reducible oxide to said easily-reducible oxide being about 1:20 to 2:3, firing the coated ceramic member in air and at a temperature below 1150° C. but at which the oxide mixture wets the underlying ceramic member and alloys thereto, thereafter firing the coated ceramic member in a gaseous reducing atmosphere at a temperature below 1150° C. but at which the easily-reducible oxide in a surface portion of the coating is reduced to the metal and the difficultly-reducible oxide only partially reduced so that the surface portion is rendered semiconductive, and thereafter applying a metal coating to said semiconductive surface.

4. A method as set forth in claim 3 wherein the metal coating is applied by an electroplating operation.

5. A method as set forth in claim 3, wherein the reducing atmosphere comprises inert gases and carbon monoxide produced by reacting a hydrocarbon gas with air.

6. A method of metallizing an alumina ceramic member comprising, applying to a surface portion of said ceramic member an oxide mixture including a minor proportion of a difficultly-reducible oxide having a standard free energy of formation in excess of 80 kilocalories/gram-atom of oxygen and a major proportion of an easily-reducible oxide having a standard free energy of formation not in excess of approximately 58.4 kilocalories/gram-atom of oxygen the proportions by weight of said difficultly-reducible oxide to said easily-reducible oxide being about 1:20 to 2:3, firing the coated ceramic member in air and at a temperature below 1150° C. but at which the oxide mixture wets the underlying ceramic member and alloys thereto, thereafter firing the coated ceramic member in a gaseous reducing atmosphere at atmospheric pressure at a temperature below 1150° C. and at which the easily-reducible oxide in a surface portion of the coating is reduced to the metal and the difficultly-reducible oxide only partially reduced so that the surface portion contains a metal-dispersed, semiconductive matrix, and thereafter electroplating a pure metal coating onto said semiconductive surface.

7. A method as set forth in claim 6 wherein a metal member is thereafter brazed to the electroplated coating.

8. A seal structure comprising a ceramic member, a sealing layer applied to a surface portion of said ceramic member, said layer comprising a matrix comprising an intimate mixture of a metal of an easily reducible oxide selected from the group consisting of copper, nickel, cobalt, silver, iron, gold, platinum and palladium, a difficultly reducible metal oxide having a standard free energy of formation, for the lowest state of oxygen, in excess of 80 kilocalories/gram atom of oxygen and the metal of said metal oxide, the ratio of the metal of the easily reducible oxide in oxide form to said metal oxide being from 1:20 to 2:3 and a metal layer bonded to a surface portion of said sealing layer.

9. A seal structure comprising a refractory ceramic member, a sealing layer applied to a surface portion of said ceramic member, said layer comprising a matrix comprising an intimate mixture of a metal of an easily reducible oxide selected from the group consisting of copper, nickel, cobalt, silver, iron, gold, platinum and palladium, a difficultly reducible metal oxide having a standard free energy of formation, for the lowest state of oxygen, in excess of 80 kilocalories/gram atom of oxygen and the metal of said metal oxide, the ratio of the metal of the easily reducible oxide in oxide form to said metal oxide being from 1:20 to 2:3 and a metal layer bonded to a surface portion of said sealing layer.

10. A seal structure comprising a high temperature ceramic member, a sealing layer applied to a surface portion of said ceramic member, said layer comprising a matrix comprising an intimate mixture of a metal of an easily reducible oxide selected from the group consisting of copper, nickel, cobalt, silver, iron, gold, platinum and palladium, a difficultly reducible metal oxide having a standard free energy of formation, for the lowest state of oxygen, in excess of 80 kilocalories/gram atom of oxygen and the metal of said metal oxide, the ratio of the metal of the easily reducible oxide in oxide form to said metal oxide being from 1:20 to 2:3 and a metal layer bonded to a surface portion of said sealing layer.

11. A seal structure as set forth in claim 10 wherein the oxide is vanadium oxide, and the metal is copper.

12. A seal structure as set forth in claim 10 wherein the oxide is titanium oxide, and the metal is copper.

13. A vacuum-tight metal-to-ceramic seal structure comprising an alumina ceramic member, a sealing layer applied to a surface portion of said ceramic member, said layer comprising a matrix comprising an intimate mixture of a metal of an easily reducible oxide selected from the group consisting of copper, nickel, cobalt, silver, iron, gold, platinum and palladium, a difficultly reducible metal oxide having a standard free energy of formation, for the lowest state of oxygen, in excess of 80 kilocalories/gram atom of oxygen and the metal of said metal oxide, the ratio of the metal of the easily reducible oxide in oxide form to said metal oxide being from 1:20 to 2:3 and a metal layer, said metal layer being brazed to a metal member bonded to a surface portion of said sealing layer.

14. A seal structure as claimed in claim 13 wherein the oxide is zirconium oxide and the metal is a mixture of copper and cobalt.

15. A seal structure as claimed in claim 13 wherein the oxide is chromium oxide and the metal is a mixture of copper and cobalt.

References Cited in the file of this patent

UNITED STATES PATENTS

| | | |
|---|---|---|
| 1,090,456 | Darrah | Mar. 17, 1914 |
| 2,667,427 | Nolte | Jan. 26, 1954 |
| 2,670,572 | Smith | Mar. 2, 1954 |
| 2,770,923 | Dalton et al. | Nov. 20, 1956 |
| 2,776,472 | Mesick | Jan. 8, 1957 |
| 2,798,577 | Forge | July 9, 1957 |
| 2,808,448 | Bleuze et al. | Oct. 1, 1957 |
| 2,842,699 | Germeshausen et al. | July 8, 1958 |
| 2,857,663 | Beggs | Oct. 28, 1958 |
| 2,859,562 | Dorgelo et al. | Nov. 11, 1958 |

OTHER REFERENCES

Electronic Engineering, pages 290–294, July 1955.